US006623304B2

(12) United States Patent
Harasawa et al.

(10) Patent No.: US 6,623,304 B2
(45) Date of Patent: Sep. 23, 2003

(54) CONNECTOR FOR FLASH MEMORY CARD, CONNECTION STRUCTURE USING CONNECTOR AND ELECTRONIC APPARATUS USING CONNECTION STRUCTURE

(75) Inventors: Masaaki Harasawa, Kanagawa (JP); Hironori Handa, Kanagawa (JP)

(73) Assignee: J.S.T. Mfg. Co. Ltd., Osaka (JP)

( * ) Notice: Subject to any disclaimer, the term of this patent is extended or adjusted under 35 U.S.C. 154(b) by 0 days.

(21) Appl. No.: 10/098,557

(22) Filed: Mar. 18, 2002

(65) Prior Publication Data

US 2002/0132528 A1 Sep. 19, 2002

(30) Foreign Application Priority Data

Mar. 19, 2001 (JP) ..................................... P2001-078541

(51) Int. Cl.[7] .............................................. H01R 24/00
(52) U.S. Cl. ...................... 439/630; 439/326; 439/945; 361/784; 361/803
(58) Field of Search .................... 439/630, 326, 439/331, 327, 945, 632; 361/737, 784, 785, 790, 803, 807

(56) References Cited

U.S. PATENT DOCUMENTS

| 5,933,328 | A | | 8/1999 | Wallace et al. | |
|---|---|---|---|---|---|
| 6,062,887 | A | * | 5/2000 | Schuster et al. | ............ 439/218 |
| 6,386,920 | B1 | * | 5/2002 | Sun | .............. 439/630 |
| 6,468,101 | B2 | * | 10/2002 | Suzuki | ........................ 439/326 |

* cited by examiner

*Primary Examiner*—P. Austin Bradley
*Assistant Examiner*—Truc Nguyen
(74) *Attorney, Agent, or Firm*—Oblon, Spivak, McClelland, Maier & Neustadt, P.C.

(57) ABSTRACT

In a connector main body, a first card installing space used to install an SD card is formed, and also, a second card installing space used to install a SIM card is formed between this first card installing space and a mounting wiring board. A SIM card connector mounted on the mounting wiring board is faced to the second card installing space. Since the SIM card is installed in this second card installing space, and a stopper is slide along rails so as to be moved on the SIM card, the connection condition between the SIM card and the SIM card connector can be maintained. Under this condition, the SD card can be mounted or dismounted with respect to the first card installing space.

12 Claims, 11 Drawing Sheets

CONNECTOR FOR FLASH MEMORY CARD, CONNECTION STRUCTURE USING CONNECTOR AND ELECTRONIC APPARATUS USING CONNECTION STRUCTURE

BACKGROUND OF THE INVENTION

1. Field of the Invention

The present invention is related to a connector used for connecting a card, which is employed so as to install a flash memory card such as an SD card, a Smartmedia, a multimedia card and a memory stick, and also so as to install a chip card such as an SIM (Subscriber Identity Module) card on mounting wiring boards of various sorts of appliances. The present invention is also related to a connection structure using such a connector, and further, an electronic apparatus employing such a connection structure.

2. Description of the Related Art

Flash memory cards are made in the form of card shapes in which memory chips are sealed in card type outer shells. As such flash memory cards, various technical standards have been proposed for, for instance, an SD card, a multimedia card, a Smartmedia, a compact flash (CF) card, and a memory stick. Chip cards correspond to IC cards in which semiconductor chips are assembled. As these chip cards, various technical specifications have been proposed for such as a SIM card and a UIM card.

There are many possibilities that card slots used to install flash memory cards are provided with information appliances such as personal computers, especially, portable type information appliances which are typically known as PDAs (Personal Digital Assistance) and portable telephones. Plural sorts of card slots may be equipped with certain information appliances in order that two, or more sorts of cards may be installed.

On the other hand, memory ICs used to store thereinto subscriber identification information are provided in portable telephones. In the case that this memory IC is fixedly connected to a portable telephone, for example, when this portable telephone is replaced by purchasing a new model type portable telephone, the subscriber information is required to be written into a memory IC of this new model type portable telephone. Also, in the case that an owner of a portable telephone is changed by a new owner, a storage content of a memory IC thereof must be rewritten.

Especially, in Europe and the like, the following idea has been proposed. That is, while subscriber identification information is written into IC cards called as SIM (Subscriber Identity Module) cards, such connectors capable of mounting and dismounting these SIM cards, if required, are fixed on portable telephones. As a result, when a present portable telephone is replaced by purchasing a new portable telephone, such an SIM card may be merely mounted on this new portable telephone. Also, in the case that an owner of a portable telephone is changed, since the SIM card of this owner may be merely replaced by such a SIM card of a new owner, the portable telephone may be immediately used by the new owner, and furthermore, writing operation of the subscriber identification information may be omitted, or rewriting operation of this subscriber identification may be omitted.

Very recently, in order to store image data and voice data, such portable telephones capable of installing flash memory cards such as an SD card and a memory stick are commercially available in markets. In this sort of electronic appliance, in order that a SIM card may be furthermore mounted and dismounted, a connector used for two flash memory cards corresponding to two different sorts of cards is required to be equipped with a portable telephone. However, when the conventional connectors are employed, bulky portable telephones are necessarily manufactured.

This problem could be solved by employing, for instance, such a connection structure as disclosed in U.S. Pat. No. 5,933,328, by which two sheets of cards are overlapped with each other to be installed on the portable telephone.

However, in this conventional technique, both the SIM card and the multimedia card are connected and disconnected at the same time with respect to the portable telephone. As a result, even when only the multimedia card is wanted to be replaced, since the connection of the SIM card is also released, the power supply of the portable telephone must be turned OFF. As a consequence, this conventional portable telephone equipped with the above-described connection structure is not always a user-friendly appliance.

SUMMARY OF THE INVENTION

Therefore, an object of the present invention is to provide a connector used for a flash memory card, which can mount thereon both a flash memory card and a chip card by using a small space, and moreover, can maintain a connection condition of the chip card even when the flash memory card is mounted or dismounted.

Also, another object of the present invention is to provide a connection structure which can mount thereon both a flash memory card and a chip card by using a small space, and moreover, can maintain a connection condition of the chip card even when the flash memory card is mounted or dismounted.

A further object of the present invention is to provide a user-friendly electronic apparatus be being equipped with the above-described connection structure.

To achieve the above-described objects, a connector used for a flash memory card, according to a first object of the present invention, is featured by including: a connector main body (1) which is constituted in such a manner that the connector main body can be mounted on a mounting wiring board (7), and which contains a first card installing space (71) for accepting a flash memory card (100, 250) from a substantially vertical direction with respect to a major surface of the mounting wiring board so as to hold the accepted flash memory card, and furthermore, owns a second card installing space (72) for accepting a chip card (200) between the first card installing space and the mounting wiring board; a signal connection contact (2) fixed on the connector main body, which contains both a contact point portion (21) contacted to a signal connection portion of the flash memory card under application of pressure and a connection portion (22) electrically connected to the mounting wiring board; and a stopper (80) for holding the chip card installed in the second card installing space within the second card installing space. It should be understood that the numerals indicated in blanks represent corresponding structural elements employed in the below-mentioned embodiments. This item is the same as in the below-mentioned aspects of the present invention.

In general, a flash memory card corresponds to such a card that a memory chip is sealed in a card type outer shell. The flash memory card involves an SD card, a multimedia card, a Smartmedia, a memory stick, a compact flash card, and the like. A chip card corresponds to such an IC card that a semiconductor chip is assembled in this card. The chip card involves a SIM card, a UIM card, and the like.

In accordance with this structure, the flash memory card can be installed in the first card installing space whereas the chip card can be installed into the second card installing space between this flash memory card and the mounting wiring board. As a result, since both the flash memory card and the chip card can be connected to the mounting wiring board under such a condition that the flash memory card is overlapped with the chip card, two different sorts of cards can be installed within a small space.

Also, even when the flash memory card is dismounted from the first card installing space, the chip card can be held in the second card installing space by way of the function of the stopper. In other words, the flash memory card may be disconnected and/or replaced without releasing the connection condition between the chip card and the mounting wiring board. A flash memory card connector, according to the second aspect of the present invention, is featured by that the flash memory card has a signal connection portion in the vicinity of one edge thereof; the flash memory card connector further includes: a cover member (5) pivotally mounted with respect to one end portion of the connector main body, for restricting one end portion of the flash memory card within the first card installing space under such a closed condition that at least a portion of the first card installing space is closed; and a lock mechanism (54, 56, 17) for locking the cover member to the closed condition with respect to the connector main body; and wherein: the contact point portion of the signal connection contact is made in contact with the signal connection portion of the flash memory card under application of pressure at another end portion thereof located opposite to the one end portion of the connector main body; and a restricting member (4) for restricting another end portion of the flash memory card is provided in the vicinity of the another end portion of the connector main body, while the restricting member being engaged to the another end portion of the flash memory card.

The above-described restricting member may be formed in such a manner that an outer shell having a substantially "C-shaped" section is formed, while accepting the other end portion of the flash memory card in conjunction with the connector main body. Alternatively, this restricting member may be made as a separate component from the connector main body, or may be made in an integral form with respect to the connector main body.

In accordance with this invention, while the flash memory card is installed in the first card installing space of the connector main body, one end portion of this flash memory card is restricted by locking the cover member to the connector main body, and also the other end portion of this flash memory card is restricted by the restricting member. With employment of such a structure, the flash memory card can be firmly held in the card installing space. Then, the electric connection between the signal connection contact and the flash memory card can be firmly maintained by such a manner that the other end portion of the flash memory card is restricted by the restricting member. As a result, high anti-shock characteristic can be realized.

Furthermore, since the flash memory card can be installed while the cover member is brought into the opened condition, this flash memory card can be installed along the direction opposite to the mounting wiring board. As a consequence, since the connector need not be arranged on the outer peripheral portion of the mounting wiring board, the free degree of the arrangement of the connector can be increased.

A flash memory card connector, according to a third aspect of the present invention, is featured by such a flash memory card connector as recited in the first or second aspect wherein: the flash memory card owns a substantially rectangular shape in which a notch (101) for preventing an erroneous installation is formed in one corner portion thereof; the first card installing space is made in a substantially rectangular shape fitted to the flash memory card; and an erroneous installation preventing portion (31) corresponding to the notch is provided on the connector main body, while the erroneous installation preventing portion is projected to the first card installing space.

Also, a flash memory card connector, according to a fourth aspect of the present invention, is featured by such a flash memory card connector as recited in any one of the first to third aspect wherein: the chip card owns a substantially rectangular shape in which a notch (201) for preventing an erroneous installation is formed in one corner portion thereof; the second card installing space is made in a substantially rectangular shape fitted to the chip card; and an erroneous installation preventing portion (85) corresponding to the notch is provided on the connector main body, while the erroneous installation preventing portion is projected to the second card installing space.

In accordance with this structure, the erroneous installation preventing portion which is projected into either the first or second card installing space is matched with the notch of either the flash memory card or the chip card, so that the erroneous installation of either the flash memory card or the chip card can be prevented. Since either the first or second card installing space accepts both the flash memory card and the chip card from the direction opposite to the mounting wiring board, an operator who tries to install a card can visibly confirm the erroneous installation preventing portion before being installed. As a result, since the operator can immediately recognize the correct installation attitude of either the flash memory card or the chip card, either the flash memory card or the chip card can be quickly installed.

The above-described cover member may be preferably made of a metal. As a result, heat generated from the flash memory card can be radiated via the cover member to the peripheral portion thereof, and also, can shield noise.

In order to achieve a better noise shielding effect, under such a condition that the cover member is closed, a noise-shielding connection member may be preferably and furthermore provided, while this noise-shielding connection member causes this cover member to a low impedance portion (namely, either power supply portion or ground portion) of the mounting wiring board.

Also, when an extension portion (54 to 57) for covering a portion of the installing space is provided on a side portion of the cover member, the noise shielding effect may be increased.

Preferably, the cover member may be provided with a spring piece which is made in contact with the outer surface of the flash memory card under application of pressure.

With employment of this structure, heat generated from the flash memory card may be radiated via the spring piece (for instance, spring piece made of metal and made in integral body with cover member).

Preferably, such a heat transfer member may be mounted on this connector main body, while this heat transfer member is made in contact with this cover member under closed condition of this cover member under application of pressure, and also is joined to the mounting wiring board so as to form a heat radiation path to the mounting wiring board.

In accordance with this construction, heat generated from the flash memory card may be transferred via the spring piece to the cover member made of the metal material, and may be furthermore transferred via the heat transfer member (alternatively, such member having common function as above-described noise-shielding connection member) to the mounting wiring board. As a consequence, overheat of the flash memory card can be effectively prevented.

A flash memory card connection structure, according to a fifth aspect of the present invention, is featured by including: a mounting wiring board (7); the flash memory card connector (10, 300) as recited in any one of the above-described first to fourth aspects, which is mounted on the mounting wiring board; and a chip card connector (75) provided with a signal connection contact (66), which is mounted on the mounting wiring board in such a manner that the chip card connector is located within the second card installing space of the flash memory card connector, while the signal connection contact includes both a contact point portion (66a) which is made in contact to the signal connection portion of the chip card under application of pressure, and also a connection portion (66b) which is electrically connected to the mounting wiring board.

With employment of this structure, the effects as described in connection with the first aspect of the present invention can be realized.

An electric apparatus, according to a sixth aspect of the present invention, is featured by including: the flash memory card connection structure as recited in the fifth aspect.

With employment of this structure, since two sheets of cards can be installed within a small space, this structure can contribute that the electronic apparatus can be made compact.

DETAILED DESCRIPTION OF THE PREFERRED EMBODIMENTS

Referring now to the accompanying drawings, embodiments of the present invention will be described in detail.

Figure 1:
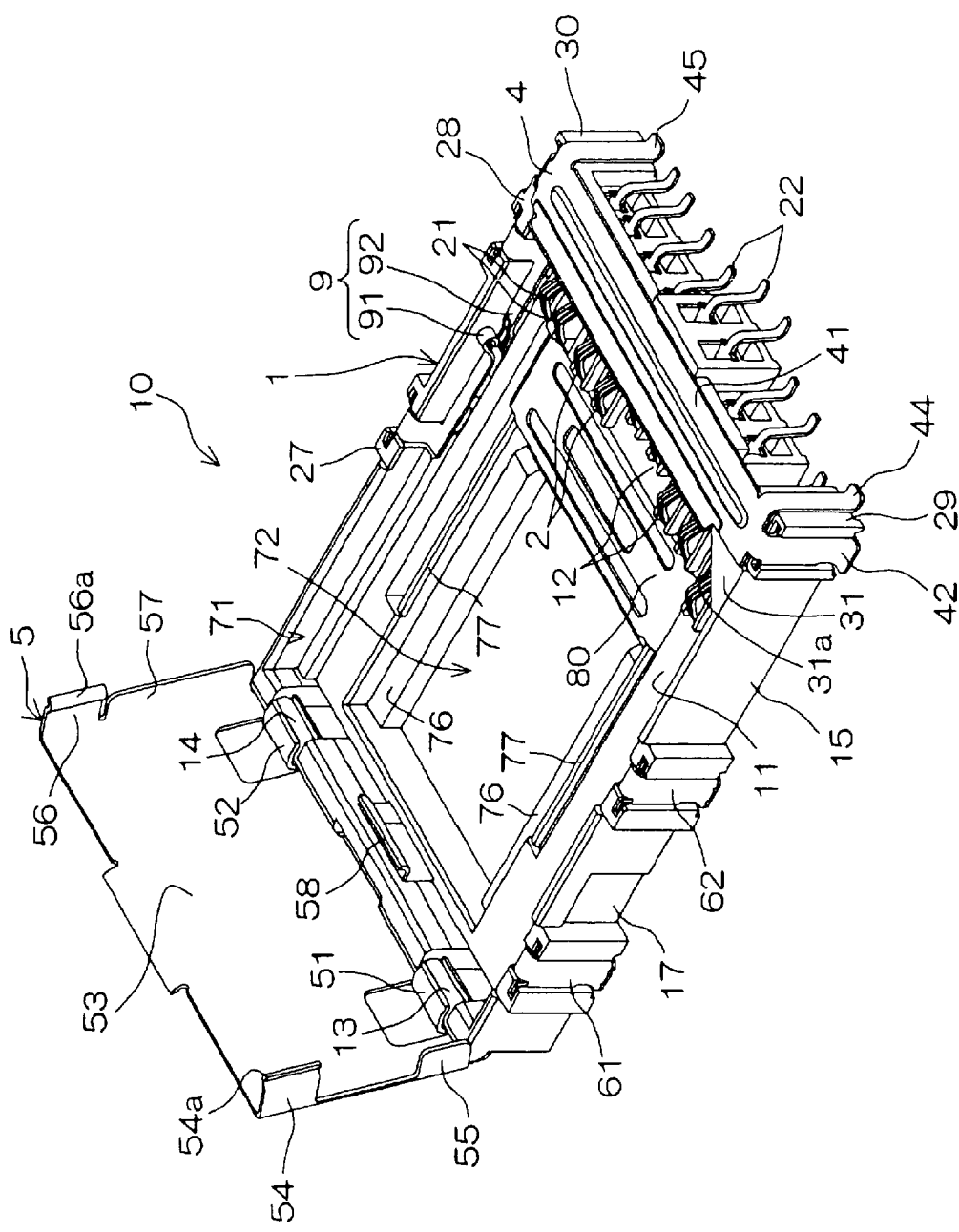
FIG. 1 is a perspective view for indicating a structure of a flash memory card connector according to an embodiment of the present invention.
Figure 2:
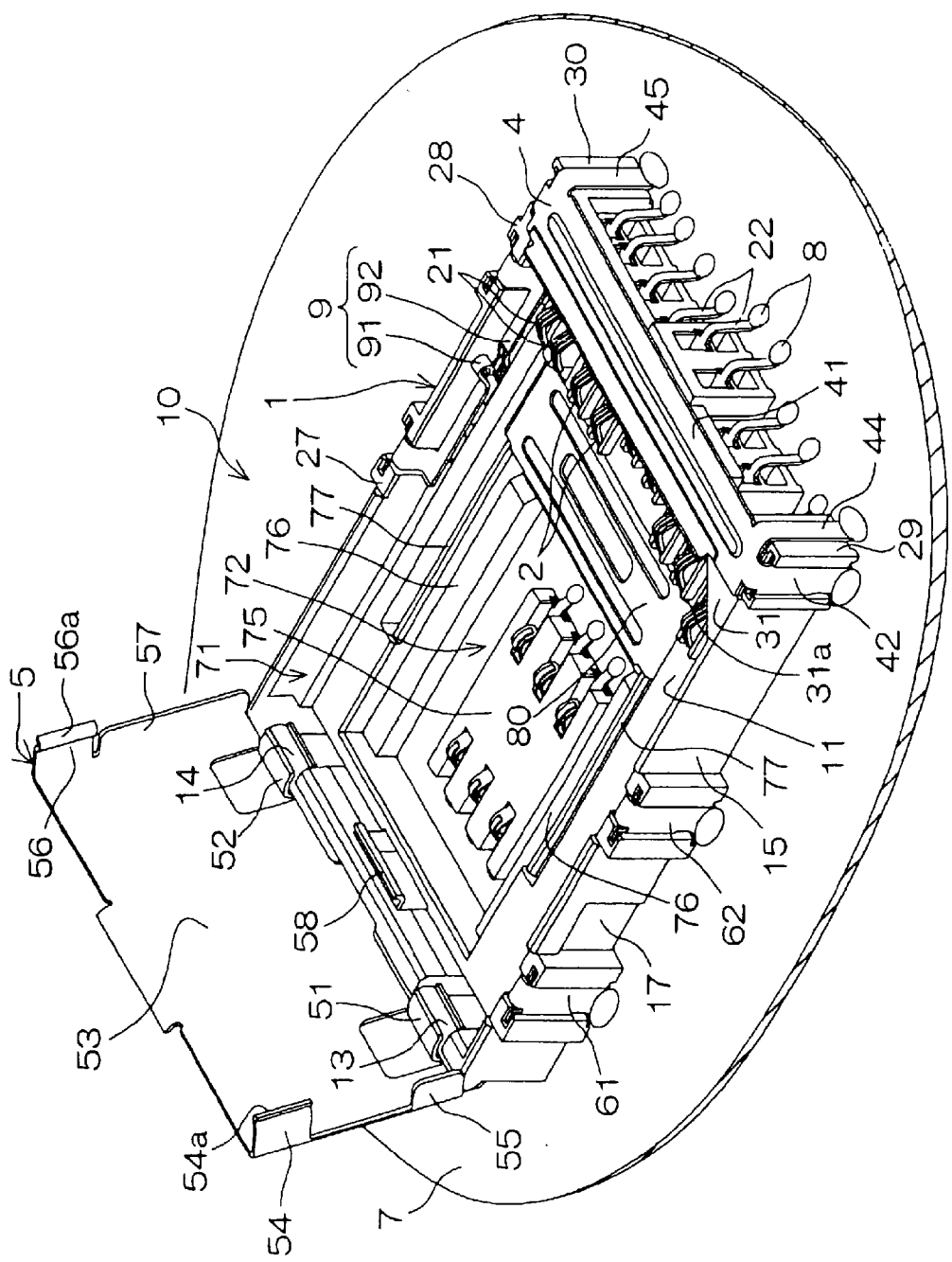
FIG. 2 is a perspective view for showing a construction in which the above-described flash memory card connector is mound on a mounting wiring board.
Figure 3:
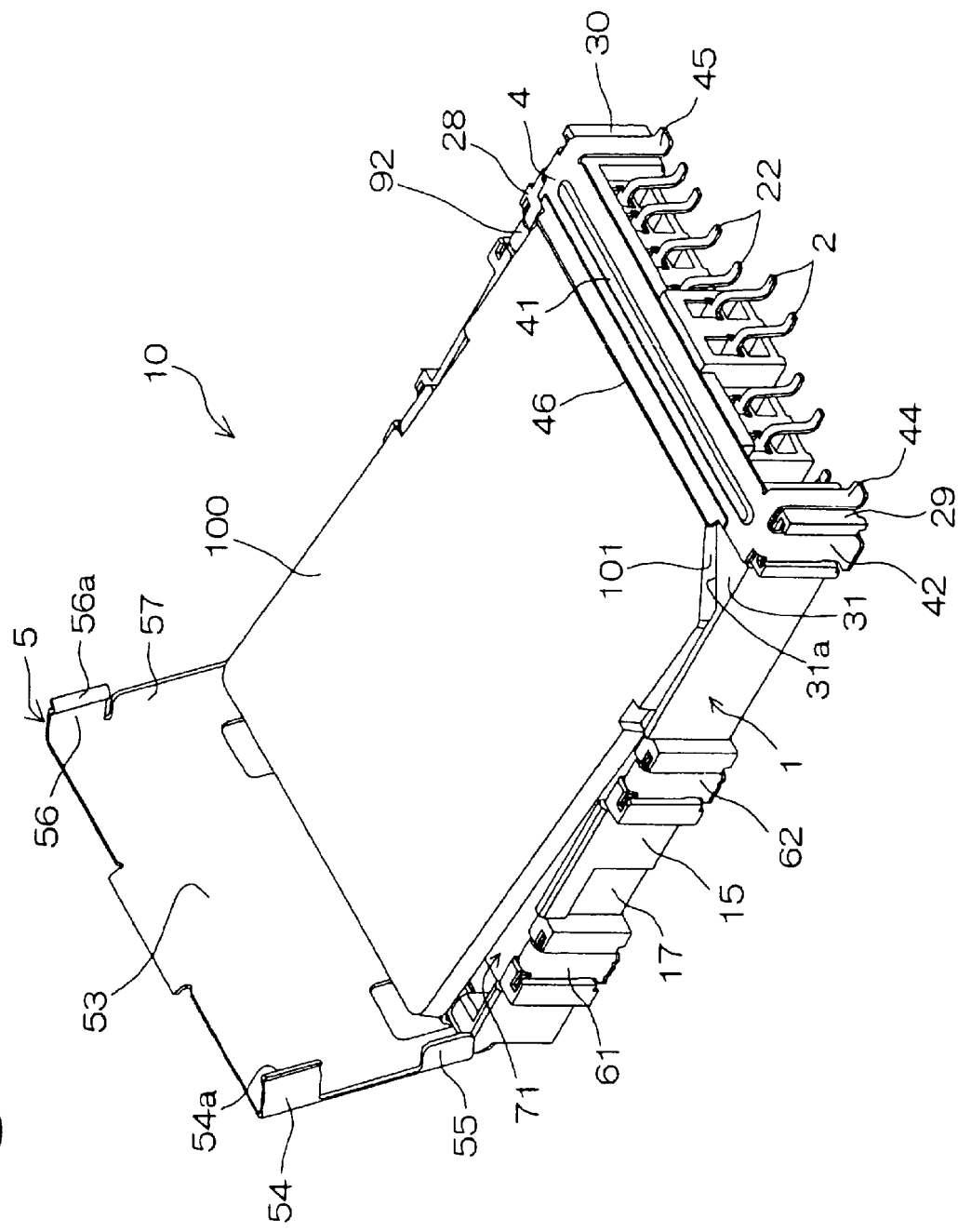
FIG. 3 is a perspective view for indicating a stage for mounting a flash memory card on the above-described connector.

FIG. 1 is a perspective view for indicating a structure of a connector 10 used for a flash memory card, according to an embodiment of the present invention. FIG. 2 is a perspective view for indicating a construction in which this connector 10 used for the flash memory card is mounted on a mounting wiring board 7. Also, FIG. 3 is a perspective view for showing such an intermediate condition that an SD card 100 functioning as an example of the flash memory card is installed into the above-described connector 10. This connector 10 used for the flash memory card corresponds to such a connector which is employed so as to mount the SD card 100 on the mounting wiring board 7 of an appliance (electronic apparatus). This appliance is typically known as a portable telephone, a notebook type personal computer, a digital household appliance, and so on.

This connector 10 is equipped with a connector main body 1 and a cover member 5. The connector main body 1 is mounted on the mounting wiring board 7 of the appliance. The cover member 5 is coupled with respect to this connector main body 1 in freely openable and closable manner. The connector main body 1 is constructed of a mold product made of a synthetic resin material, and owns a substantially rectangular frame shape, as viewed in a plan view. A plurality (namely, 9 pieces in this embodiment) of contacts 2 are arrayed side by side in the vicinity of one short edge of this connector main body 1. The contacts 2 are made of a metal material having an elastic characteristic.

A first card installing space 71 is defined inside the connector main body 1. Each of these contacts 2 contains a contact point portion 21, and a connection portion 22. The contact point portion 21 is projected toward the first card installing space 71. The connection portion 22 is connected to this contact point portion 21, and is projected along a longitudinal direction of the connector main body 1 in the vicinity of one edge of the connector main body 1. The connection portion 22 is arranged in such a manner that this connection portion 22 is located at the substantially same plane as a bottom plane of the connector main body 1. This bottom plane is a surface located opposite to the mounting wiring board 7 of the appliance. The respective connection portions 22 are jointed to the mounting wiring board 7 of the appliance by way of solder 8.

While the contact point portion 21 is fitted into slit portions 12 which are formed and raised from a bottom plane wall 11, this contact point portion 21 is projected toward the first card installing space 71 in a substantially arc shape. A plurality of slit portions 12 are formed in parallel to each other along the longitudinal direction of the connector main body 1. Two sets of slit portions 12 located in the vicinity of a center portion thereof are formed in such a manner that these slit portions 12 are positionally shifted by a predetermined distance along the longitudinal direction of the connector main body 1 toward the outer side of the first card installing space 71. Also, one slit portion 12 of one edge thereof is formed in such a manner that this slit portion 12 is positionally shifted by a predetermined distance along the longitudinal direction of the connector main body 1 toward the inner side of the first card installing space 71. The arrangement of the contact point portions 21 of the respective contacts correspond to the above-explained array of the slit portions 12.

The SD card 100 is formed in a substantially rectangular card shape. A notch 101 capable of preventing an erroneous installation is formed in an one corner portion of this SD card 100. In correspondence to this notch 101, an erroneous installation preventing portion 31 is formed in an integral manner thereto in the vicinity of an edge portion of the connector main body 1 on the side of the contacts 2 at such a position corresponding to this notch 101, while this erroneous installation preventing portion 31 is extended to the first card installing space 71. The notch 101 has a notched shape which is made by obliquely notching one corner portion of the SD card 100. In correspondence with this notch 101, the erroneous installation preventing portion 31 owns a restricting plane 31a. This restricting plane 31a is extended to one corner portion of the substantially rectangular-shaped first card installing space 71, as viewed in a plan view thereof, and the restricting plane 31a owns a shape made by obliquely cutting off this corner portion. With employment of this structure, the erroneous installation of the SD card 100 can be firmly prevented.

A restricting member 4 is mounted in such a manner that this restricting member 4 is inserted under application of pressure into pressure-inserting portions 29 and 30 formed on both side surfaces 15 on the edge portion of the connector main body 1 on the side of the contact 2. The restricting member 4 is to restrict one edge portion of the SD card 100 installed in the first card installing space 71. As a consequence, an outer shell having a substantially "C-shaped" sectional view is formed in one edge portion of the first card installing space 71, while this outer shell may accept one edge portion of the SD card 100.

In this embodiment, the restricting member 4 is made of a metal material, and is equipped with a flat-plate-shaped restricting portion 41, a suspended portion 42, and other suspended portions 44, 45. The flat-plate-shaped restricting portion 41 is located over one edge portion of the SD card 100 installed in the first card installing space 71. The suspending portion 42 is suspended from both edges of this restricting portion 41 along the side surface 15 of the connector main body 1. The tip portions of the suspended portions 42, 44, 45 are molded in such a manner that these tip portions are bent in L-shaped forms along the mounting wiring board 7 of the appliance, while these tip portions are joined to the mounting wiring board 7 by way of solder.

One pair of cover member mounting shafts 13 and 14 are formed in an edge portion in the connector main body 1, which is located opposite to the contact 2, while the cover member 5 is pivotably coupled to these cover member mounting shafts 13 and 14. These cover member mounting shafts 13 and 14 are formed along the short edge of the connector main body 1 with maintaining an interval. Pivotable mounting portions 51 and 52 of the cover member 5 are pivotably engaged with these cover member mounting shafts 13 and 14.

The cover member 5 is provided with a main body portion 53, the above-described pivotable mounting portions 51, 52, suspended portions (reinforcing tabs) 54, 55, 56, 57, and also, a receiving portion 58. The main body portion 53 covers a portion of the first card mounting space 71 of the connector main body 1. The pivotable mounting portions 51 and 52 are formed in such a manner that a portion of a pivotable base end portion of this main body portion 53 is cut to be raised, and furthermore, these pivotable mounting portions 51 and 52 are molded on this cut/raised portion. The suspended portions 54, 55, 56 and 57 are formed in one-pair combination manner on both side portions of the main body portion 53. The receiving portion 58 receives the edge portions of the SD card 100. The receiving portion 58 is formed in such a manner that the edge portions of the cover member 5 on the side of the pivotable shafts are bent. Under open condition of the cover member 5, this receiving portion 58 passes through a penetration hole formed in the connector main body 1, and then, is projected toward the first card installing space 71.

Figure 4:
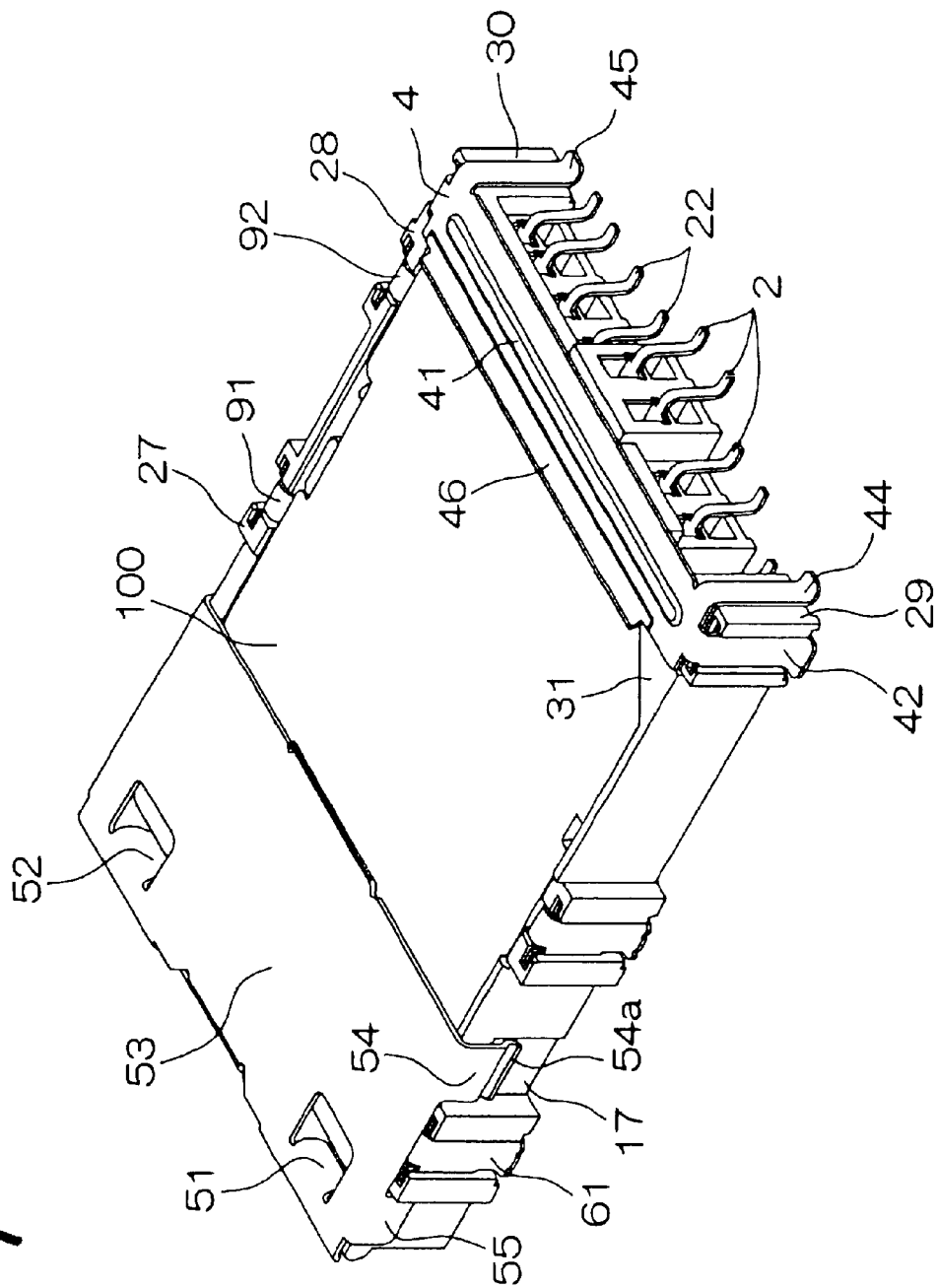
FIG. 4 is a perspective view for showing a structure in which a cover member is closed.

The suspended portions 54 to 57 may own such an attitude that these suspended portions 54 to 57 are suspended along the side surface of the connector main body 1 when the cover member 5 is pivoted from the condition illustrated in FIG. 1, FIG. 2, or FIG. 3 to another condition indicated in FIG. 4 so as to be brought into such a closed condition that a portion of the first card installing space 7 is closed by this cover member 5.

Lock portions 54a and 56a for locking the closed condition of the cover member 5 are formed on tip portions of one pair of such suspended portions 54 and 56 which are located near the center portion of the first card installing space 71 under closed condition of the cover member 5 among the above-described suspended portions 54 to 57. The lock portions 53a and 56a are projected toward the first card installing space 71 under closed condition of the cover member 5, and may form a cylindrically-curved plane which is elongated along the longitudinal direction of the connector main body 1.

Locking concave portions 17 to which lock portions 54a and 56a are engaged are formed on both sides surfaces 15 of the connector main body 1. When the cover member 5 is pivoted in such a manner that this cover member 5 is located in the proximity to the connector main body 1 and then is conducted to the closed state, these lock portions 54a and 56a are engaged to the locking concave portions 17. As a result, the cover member 5 is locked under closed condition.

Fixing tabs 61, 62 are inserted into the side surface portions of the connector main body 1 under application of pressure. These fixing tabs 61 and 62 are joined to the mounting wiring board 7 by using solder. As a result, these fixing tabs 61, 62 may strongly fix the connector main body 1 on the mounting wiring board 7.

In the first card installing space 71, a switch member 9 is arranged at such a position close to one side surface 15 of the connector main body 1, while this switch member 9 is employed so as to detect as to whether or not an SD card 100 is installed. The switch member 9 is provided with one pair of contacts 91 and 92 which are made of metal pieces having elasticity. Base portions of these contacts 91 and 92 are inserted into contact pressure-inserting portions 27 and 28 under application of pressure, which are formed on the side surfaces 15 of the connector main body 1 and are projected therefrom. The base portions of the contacts 91 and 92 are suspended along the side surfaces 15 of the connector main body 1, and then, are reached in the vicinity of the bottom plane of the connector main body 1. Then, these base portions are joined to wiring patterns formed on the mounting wiring board 7 by using solder, respectively.

In this embodiment, when the SD card 100 is installed in the first card installing space 71, one contact 91 is elastically deformed to be made in contact with the other contact 92, so that the switch member 9 may become conductive. If the SD card 100 is not installed in the first card installing space 71, then both the contacts 91 and 92 are maintained under cut-out condition. As a consequence, since the conducting and interrupting (cutout) conditions of the switch member 9 are detected on the side of the appliance, it is possible to sense as to whether or not the SD card 100 is installed.

As represented in FIG. 3, as to the SD card 100, metal terminals (not shown) functioning as a signal connection portion are installed in the first card installing space 71 under such an attitude that the metal terminals are located opposite to the contacts 2. Concretely speaking, as to the SD card 100, while a notch 101 is matched to the erroneous installation preventing portion 31, this SD card 100 is installed in the first card installing space 71. As a result, the metal terminal portion of this SD card 100 is positioned on the side of the contacts 2, and thus, the terminal portion of the metal terminal portion (namely, side of notch 101) is inserted into a space defined between the restricting member 4 and the bottom plane portion 11. A guide portion 46 which is formed in such a manner that this guide portion 46 is curved along the upper direction is provided on an edge portion of the restricting member 4 on the side of the first card installing space 71. This guide portion 46 may smoothly guide one edge portion of the SD card 100 into a space located lower the restricting member 4, while this SD card 100 is inserted from an upper oblique direction.

Since the first card installing space 71 is opened along a vertical direction with respect to a major surface of the mounting wiring board 7, an operator who tries to install the SD card 100 can easily and visibly confirm the erroneous installation preventing portion 31 before the card installation. As a result, since the correct installation attitude of the SD card 100 can be immediately recognized, even unexperienced operator may quickly install the SD card 100.

After one edge portion of the SD card 100 has been inserted into the space between the restricting member 4 and the bottom plane wall 11, the other edge portion of the SD card 100 is squeezed into the first card installing space 71. At this case, the other edge portion of the SD card 100 abuts against a receiving portion 58 which is formed on a side edge of the cover member 5 on the side of the pivot shaft. Under this condition, if the SD card 100 is furthermore squeezed into the first card installing space 71, then moment is applied from the SD card 100 via the receiving portion 58 to the cover member 5 along the closed direction. As a result, the cover member 5 starts to be pivoted along the closed direction in connection with the installing operation of the SD card 100. After the SD card 100 has been squeezed into the first card installing space 71, the operator further pivots the cover member 5 along the closed direction so as to engage the lock portions 54a and 56a to the locking concave portions 17 respectively. As a result, such a closed condition as shown in FIG. 4 is established.

Under this condition, the metal terminal portion of the SD card 100 elastically abuts against the contact portion 21 of the contact 2. This abutting condition is maintained by such a manner that one edge portion of the SD card 100 is restricted by the restricting member 4 and the cover member 5 is locked under closed condition.

A second card installing space 72 is formed in the bottom portion of the connector main body 1, while this second card installing space 72 owns a substantially rectangular shape and may penetrate the bottom plane wall 11. A dimension of this second card installing space 72 is made under such a condition that a SIM card functioning as one of chip cards may be stored thereinto. A connector 10 used for a flash memory card is mounted on the mounting wiring board 7 on which a connector 75 used for a SIM card is mounted in such a manner that this SIM card connector 75 is faced to the second card installing space 72.

As indicated in FIG. 2, one pair of holding portions 76 are formed on both side portions of the second card installing space 72, while the paired holding portions 76 hold a bottom plane of the SIM card on both sides of the SIM card connector 75. One pair of rails 77 are formed on the bottom plane wall 11 of the connector main body 1 along the both side portions of the second card mounting space 72. A stopper 80 is provided in such a manner that this stopper 80 may be slid along one pair of these rails 77.

Since the stopper 80 is slid on the paired rails 77, this stopper 80 may be deviated between a position above the second card installing space 72 and a saving position (namely, position shown in FIG. 2) saved from the second card installing space 72. The stopper 80 is constructed in such a manner that this stopper 80 is not projected into the first card installing space 71. The SD card 100 may be installed into the first card installing space 71 irrespective of the position of this stopper 80.

Figure 5:
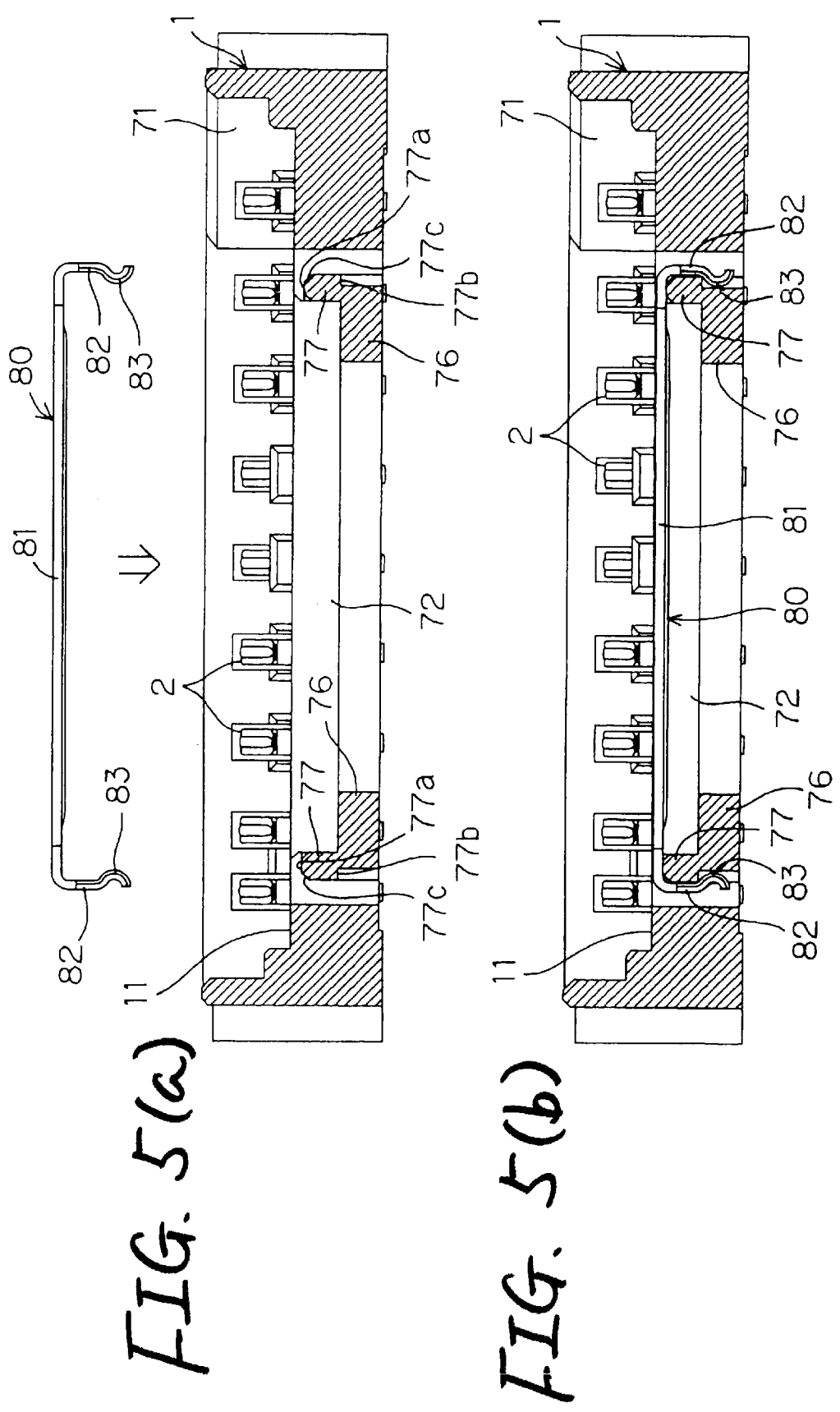
FIGS. 5(a) and 5(b) are sectional views for indicating a construction in the vicinity of a stopper.

FIGS. 5(a) and 5(b) are sectional views for indicating a construction of the card connector in the vicinity of the stopper 80. One pair of these rails 77 own both an upper plane 77a and a stepped portion 77b. The upper plane 77a is moved backwardly by the thickness portion of the stopper 80 from the first card installing space 71. The stepped portion 77b is formed at a lower portion of the upper plane 77a in order to hold the stopper 80. The stopper 80 is equipped with an abutting portion 81 having an elongated-plate shape and a suspended portion 72. The abutting portion 81 abuts against the surface of the installed in the second card installing space 72. The suspending portion 82 is suspended from both ends of this abutting portion 81. An engaging convex portion 83 having a convex curved-plane shape is formed at a portion near a lower end of the suspended portion 82, while this engaging convex portion 83 is engaged with the stepped portion 77b of the rail 77. The stopper 80 is made of a metal material having a spring characteristic. Both the engaging convex portion 83 and the stepped portion 77b may be brought into the engaging condition in such a manner that since the stopper 88 is depressed toward the rails 77 under such a condition that the engaging convex portion 83 is touched on a guide inclination surface 77c of the rail 77, the suspended portion 82 is elastically deformed so as to be expanded along an outward direction and thereafter is recovered. As a result, the stopper 80 may be mounted on the connector main body 1.

Figure 6:
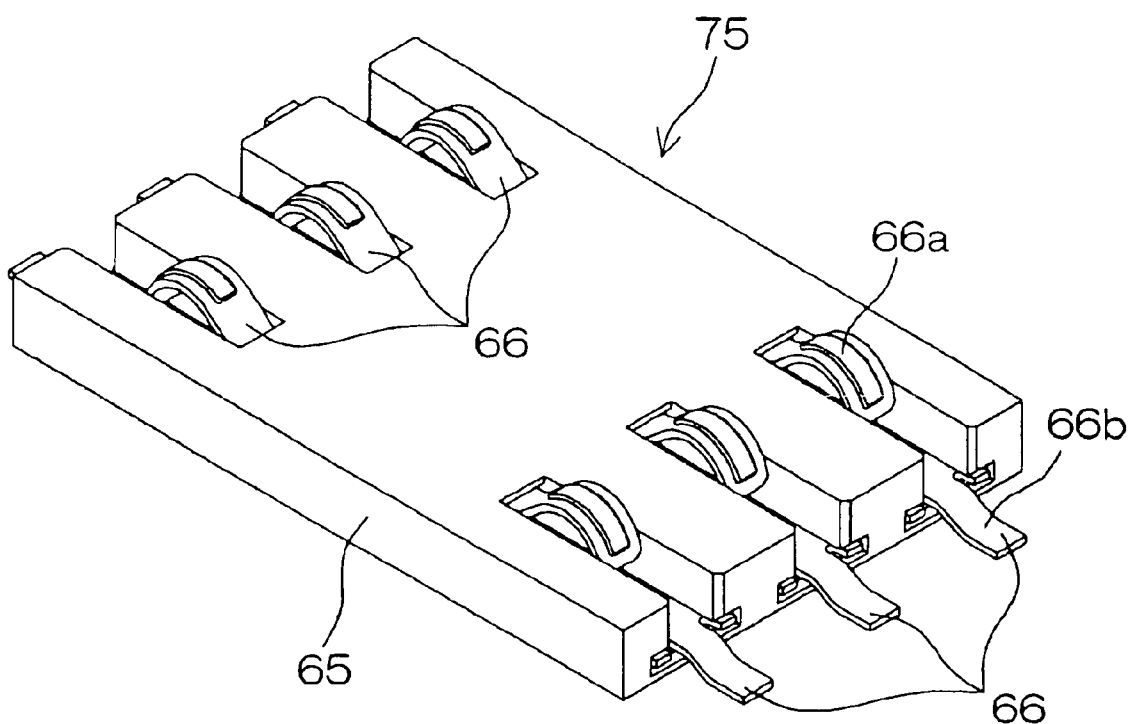
FIG. 6 is a perspective view for representing an SIM card connector.

FIG. 6 is a perspective view for showing the connector 75 used for the SIM card. The SIM card connector 75 is provided with a connector main body 65, and three contacts 66. The connector main body 65 is made of a resin material, and formed in a substantially rectangular plate shape. The three contacts 66 are provided in parallel to each other in the vicinity of both ends of this connector main body 65. The contact 66 is equipped with a contact portion 66a and a connect portion 66b. The contact portion 66a is projected from the upper surface of the connector main body 65, and is made in contact with the contacts of the SIM card under application of pressure. The connect portion 66b is connectingly provided to this contact portion 66a, and is joined to the mounting wiring board 7 by using solder. Under such a condition (see FIG. 2) that both the SIM card connector 75 and the flash memory card connector 10 are mounted on the mounting wiring board 7, both the upper surface of the connector main body 65 and the holding portion 76 are located within the substantially same plane.

Figure 7:
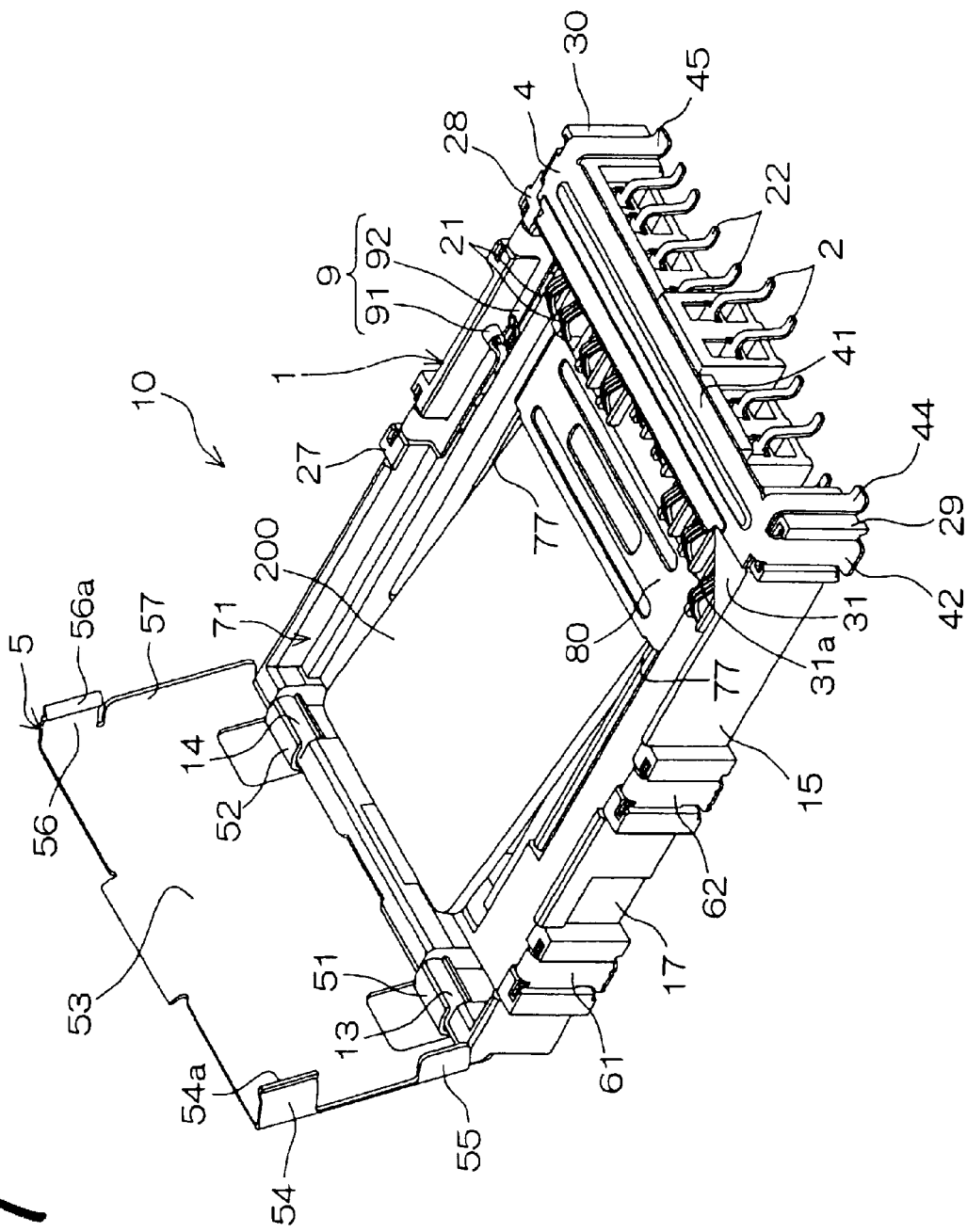
FIG. 7 is a perspective view for indicating an intermediate condition that an SIM card is installed in a second card installing space.
Figure 8:
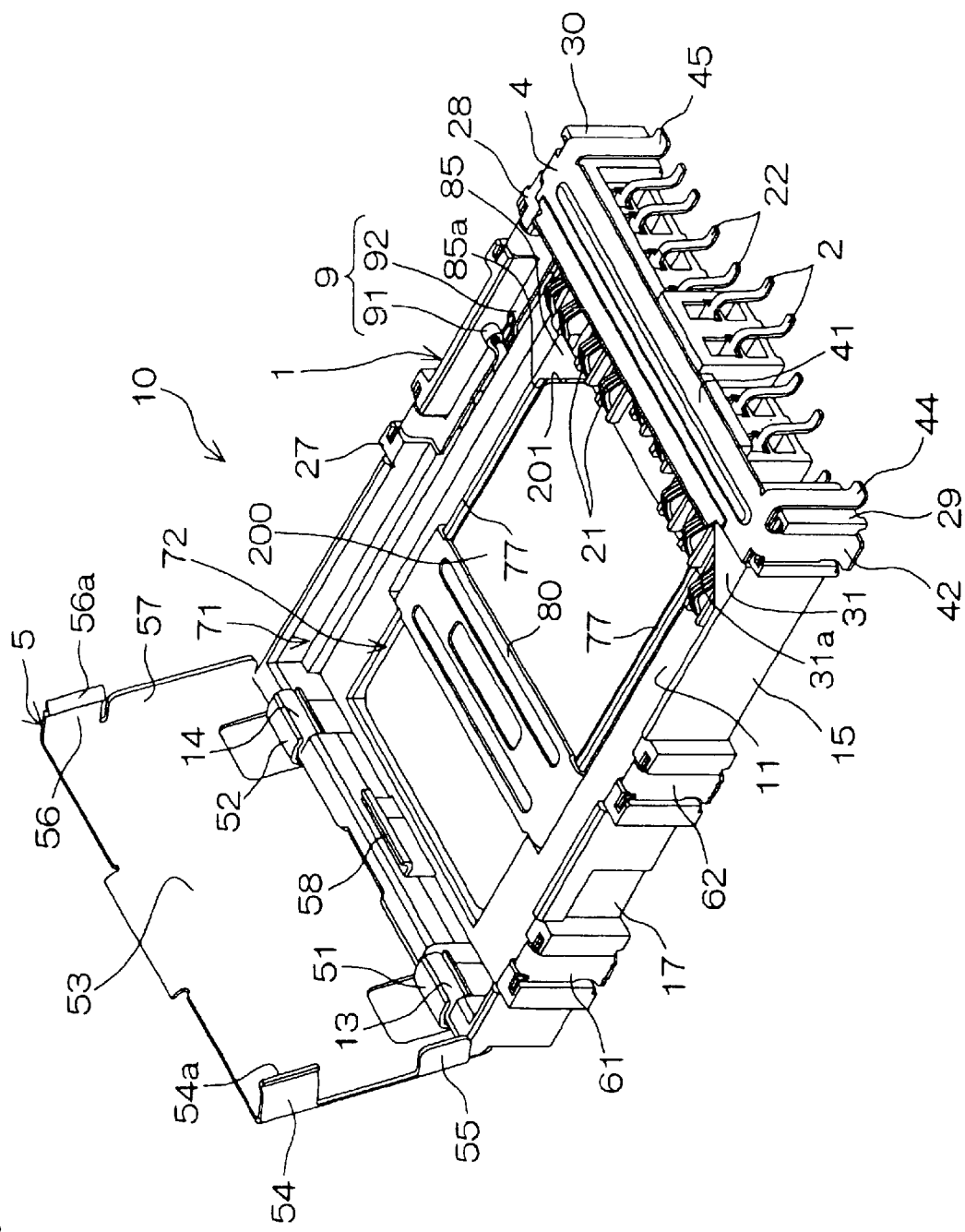
FIG. 8 is a perspective view for showing such a condition that the SIM card is installed in the second card installing space.

FIG. 7 is a perspective view for representing such an intermediate condition that a SIM card 200 is installed in the second card installing space 72. FIG. 8 is a perspective view for showing such a condition that the SIM card 200 has been installed into the second card installing space 72.

The SIM card 200 is formed in a substantially rectangular card shape. A notch 201 for preventing erroneous installations is formed in one corner portion of this SIM card 200. In correspondence with this structure, an erroneous installation preventing portion 85 is formed on the connector main body 1 in an integral body, while this erroneous installation preventing portion 85 is projected toward the second card installing space 72 at such a position corresponding to the notch 201. This notch 201 has such a shape that one corner portion of the SIM card 200 is notched along an oblique direction. In correspondence with this notched construction, the erroneous installation preventing portion 85 owns a restricting plane 85a having such a shape which is projected to one corner portion of the substantially rectangular-shaped second card installing space 72 (as viewed in plan view), and in which this corner portion is cut off along the oblique direction. With employment of this construction, the erroneous installation of the SIM card 200 can be firmly prevented.

Since the second card installing space 72 is opened with respect to the major surface of the mounting wiring board 7 along the vertical direction, an operator who tries to install the SIM card 200 can easily and visibly confirm a condition before the erroneous installation preventing portion 85 is installed. As a consequence, since the correct installation attitude of the SIM card 200 can be immediately grasped, even such an operator who has not so such experience can quickly install the SIM card 200.

When the SIM card 200 is installed, the first card installing space 71 is brought into such an uninstalled condition that the SD card 100 is not yet installed. Then, the stopper 80 is saved to the saving position on the side of the contact 20, so that the second card installing space 72 is brought into an opened condition. Under this opened condition, the SIM card 200 is installed into the second card installing space 72 from a direction substantially perpendicular to the major surface of the mounting wiring board 7. Thereafter, as shown in FIG. 8, the stopper 80 is slid on the rails 77 so as to be conducted to a substantially center position of the SIM card 200. As a result, the stopper 80 depresses the SIM card 200 against the SIM card connector 75 while resisting the elastic force of the contact point 66a of the SIM card connector 75, and also holds this condition. As a result, the contacts of the SIM card 200 are made in contact with the contact portion 66a under application of pressure, so that an electric connection between the SIM card 200 and the mounting wiring board 7 can be achieved.

Thereafter, as indicated in FIG. 3 and FIG. 4, the SD card 100 is installed in the first card installing space 71 over the SIM card 200, if necessary.

As previously explained, in accordance with this embodiment, while the second card installing space 72 is formed between the first card installing space 71 and the mounting wiring board 7, the SIM card connector 75 located over the mounting wiring board 7 can be faced with respect to the second card installing space 72. As a result, the SIM card 200 is installed in the second card installing space 72 and the SD card 100 is installed in the first card installing space 71, so that these cards can be electrically connected to the mounting wiring board 7. Since both the SIM card 200 and the SD card 100 are installed on the mounting wiring board 7 under such a condition that these SIM and SD cards 200/100 are overlapped with each other along the upper and lower directions in the above-explained manner, these two cards 100, 200 can be installed within a small space. As a consequence, such an electronic apparatus (form instance, portable telephone) capable of installing both the cards 100, 200 can be made compact.

Also, in accordance with the structure of this embodiment, the installation condition of the SIM card 200 with respect to the second card installing space 72 is maintained by the stopper 80. As a result, the SD card 100 can be uninstalled from the first card installing space 71 and also the SD card 100 can be exchanged, while the electric connection between the SIM card 200 and the mounting wiring board 7 is maintained. As a consequence, even when the power supply of the electronic apparatus such as the portable telephone is not interrupted, the SD card 100 can be uninstalled, and also can be exchanged.

Figure 9:
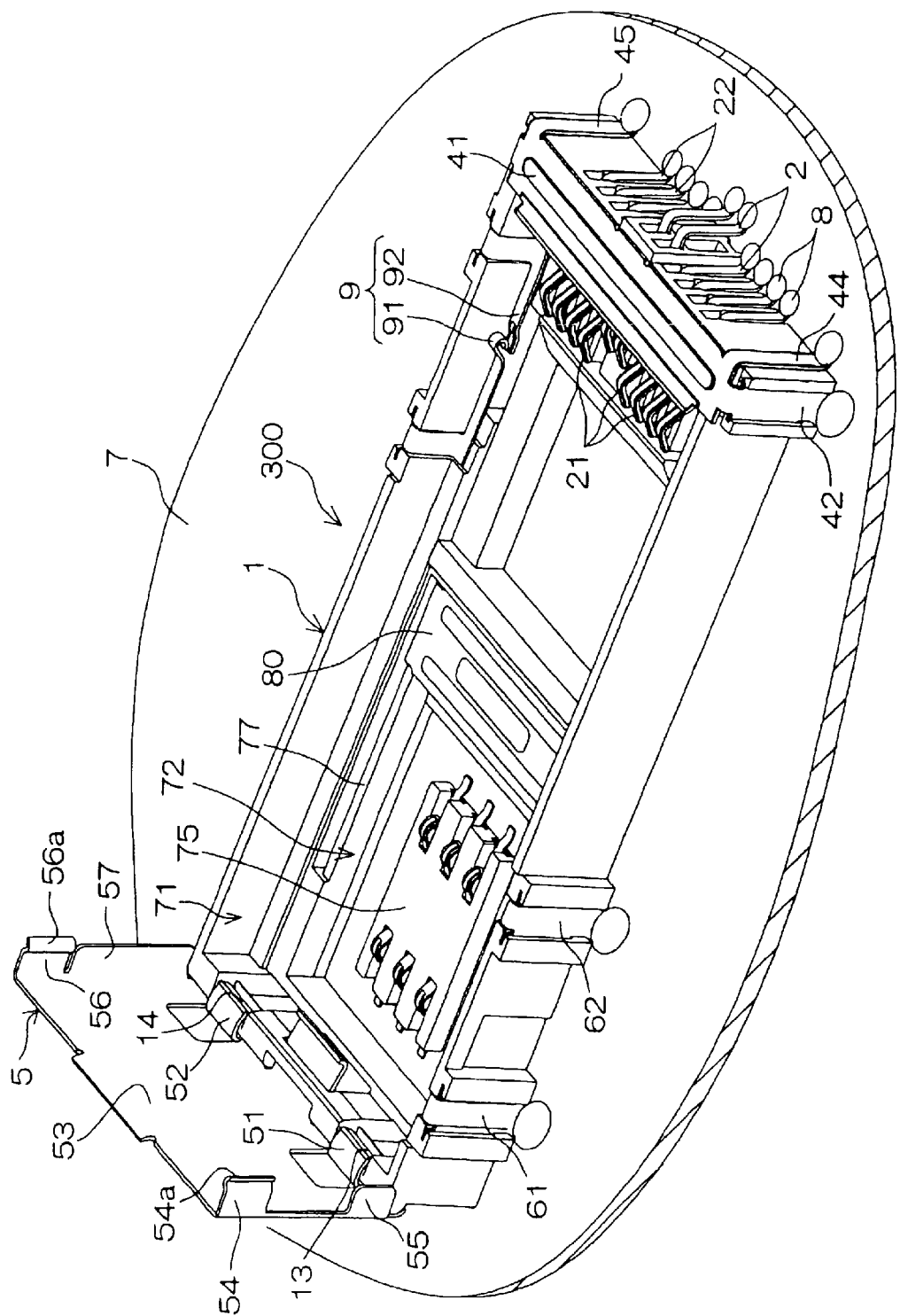
FIG. 9 is perspective view for indicating such a condition that a flash memory card according to another embodiment of the present invention is mounted on a mounting wiring board.

FIG. 9 is a perspective view for showing such a condition that a connector 300 used for a flash memory card, according to another embodiment of the present invention, is mounted on the mounting wiring board 7. This flash memory card connector 300 is employed in order that while both an SIM card and a memory stick are stacked in upper and lower two stages, both the SIM card and the memory stick are electrically connected to the mounting wiring board 7. Although a length of a connector main body 1 is made larger than the length of the connector 10 shown in FIG. 1 in order to be fitted to the shape of the memory stick, functions and shapes of the respective portions of the connector 300 are made substantially same as these of the above-explained flash memory card connector 10 according to the first embodiment. As a consequence, in this drawing of FIG. 9 and in the subsequently-explained drawings of FIG. 10 and FIG. 11, the same reference numerals shown in FIG. 1 are employed as those for denoting the portions corresponding to the respective portions shown in FIG. 1.

Figure 10:
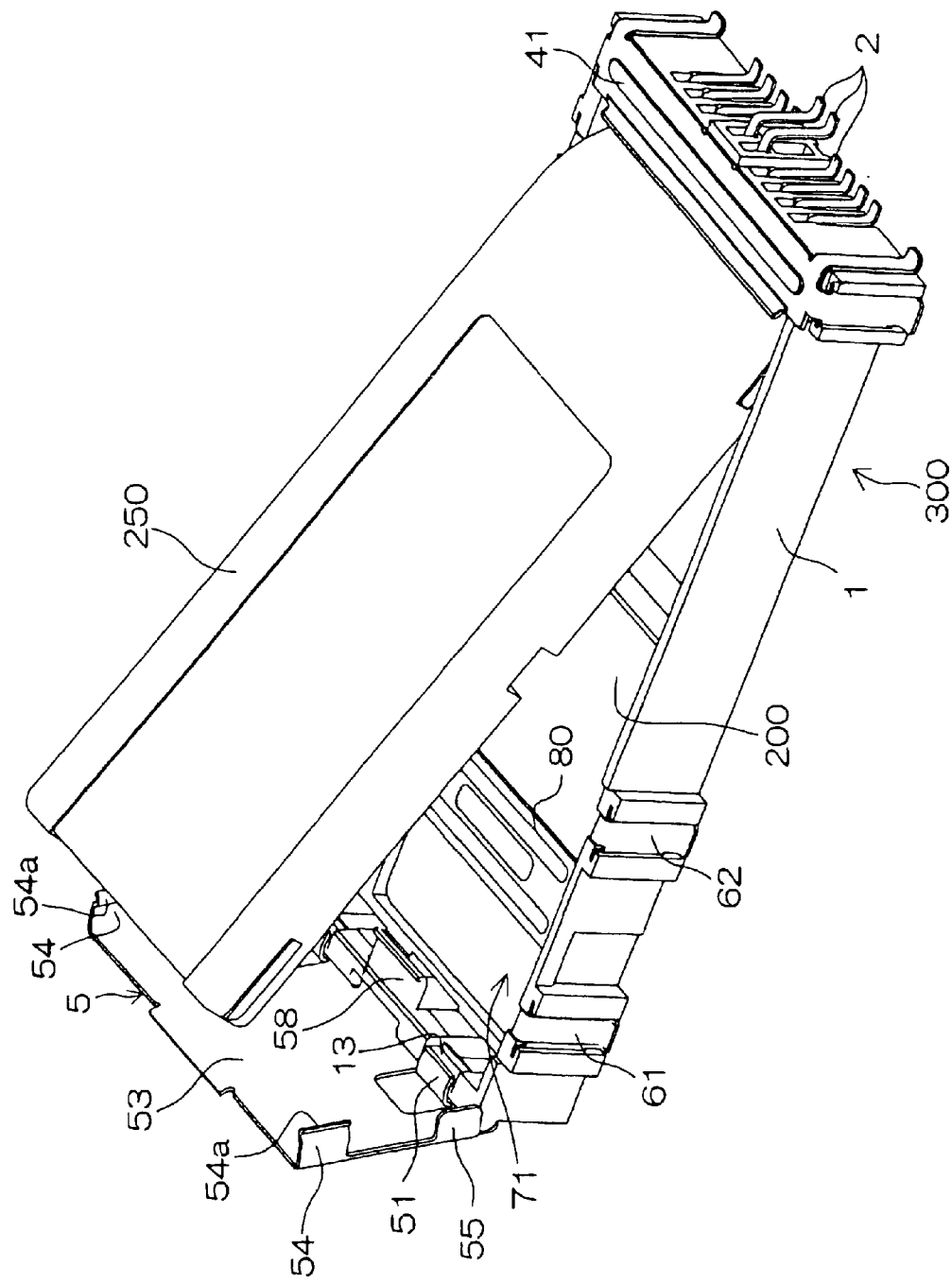
FIG. 10 is a perspective view for indicating an intermediate condition that a memory stick is installed in a first card installing space.
Figure 11:
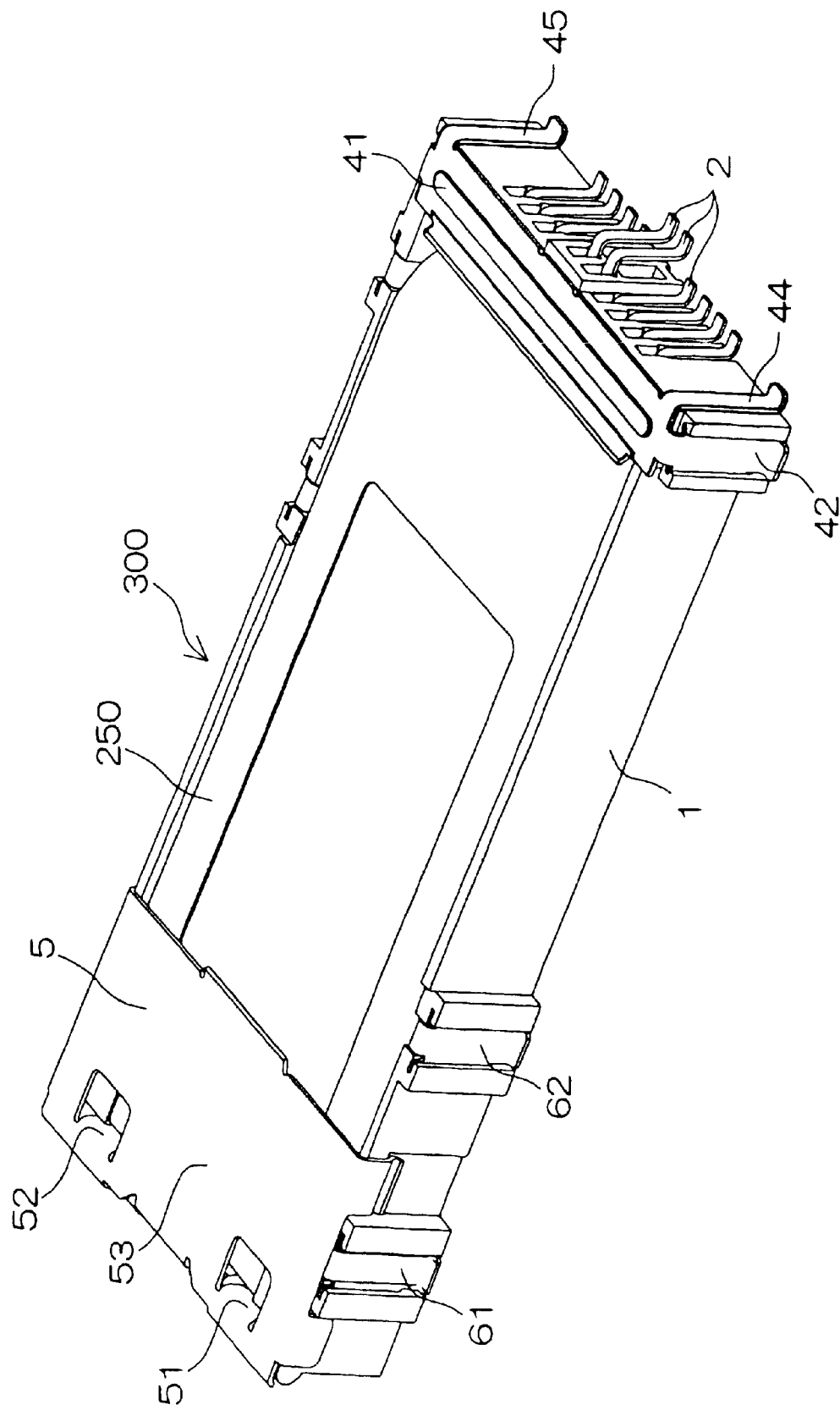
FIG. 11 is a perspective view for showing such a condition that the memory stick is installed.

FIG. 10 is a perspective view for indicating such an intermediate condition that a memory stick 250 is installed in the first card installing space 71. FIG. 11 is a perspective view for representing such a condition that the memory stick 250 has been installed in the first card installing space 71. Under such a condition that the SIM card 200 is installed in the second card installing space 72 and is restricted by the stopper 80, the memory stick 250 may be mounted or dismounted with respect to the first card installing space 71. While the memory stick 250 is installed in the first card installing space 71, the cover member 5 is laid so as to lock the memory stick 250 to the connection main body 1, so that the installation of the memory stick 250 may be completed.

Even in the above-described construction of this second embodiment, a similar effect to that of the above-explained first embodiment may be achieved. While the two embodiments of the present invention have been described in the foregoing descriptions, the present invention may be furthermore realized by way of other embodiments. For instance, in both the first embodiment and the second embodiment, the following examples have been explained. That is, both the SIM card 200 and either the SD card 100 or the memory stick 200 have been stacked in the two upper and lower stages. However, a combination between a flash memory card and a chip card is not limited only to the above combination.

Also, in the above-described embodiments, the cover member 5 is made to have such a dimension that this cover member 5 does not cover the entire portion of the first card installing space 71, but covers only a partial space in the vicinity of the edge portion which is located opposite to the contact 2. Alternatively, such a cover member having a dimension capable of covering the entire region of the first card installing space 71 may be employed. However, in order to open and close such a large-sized cover member, a large space is necessarily secured. Therefore, in such a case that there is a limitation in an opened and closed space for a cover member, it is preferable to employ the small-sized cover member 5 as represented in the above-explained embodiments.

Alternatively, a heat transfer member made of a metal may be provided at a position corresponding to either the suspended portion 54 or the suspended portion 56 of the cover member 5 in the connector main body 1, while this metal heat transfer member is lock-engageable to these suspended portions 54 and 56. For example, while a lock portion which is lock-engageable to the suspended portion 54 is provided on the fixing tab 61, this lock portion of the fixing tab 61 may be employed as the heat transfer member by being arranged at the above-described position. Since this heat transfer member is jointed to the mounting wiring board 7 by using solder, heat generated from the SD card 100 may be radiated via both the cover member 5 and the heat transfer member.

In order to effectively radiate heat generated from the SD card 100, for instance, a portion of the main body portion 53 is cut to be raised so as to preferably form a heat radiating tongue piece in the vicinity of the edge portion in the cover member 5, which is located opposite to the pivotably mounting portions 51 and 52. Preferably, this heat radiating tongue piece may have a spring characteristic, may be projected toward the inside of the first card installing space 71 under closed condition of the cover member 5, and may elastically abut against the outer surface of the SD card 100. As a result, heat generated from the SD card 100 may be transferred to the heat radiating tongue piece, so that this heat may be radiated from the main body portion 53 to air, and further may be transferred via both the heat transfer member and either the suspended portion 54 or the suspended portion 56 to the mounting wiring board 7 so as to be radiated.

Also, the above-described heat radiating member may be preferably joined to a metal portion of the mounting wiring board 7, for example, such a wiring pattern having a widened pattern width, which is biased to the ground potential by using solder. As a result, the cover member 5 made of the metal material may have a noise shielding function. In other words, such externally-applied electromagnetic noise with respect to the SD card 100 may be shielded by the cover member 5, while this SD card 100 is located at the position inside this cover member 5. Also, while the suspended portions 54 to 57 are provided on the cover member 5, these suspended portions 54 to 57 cover the first card installing space 71 from the side directions, so that these suspended portions 54 to 57 may contribute to increase the noise shielding function.

Also, in such a case that such a cover member is employed which may cover a substantially entire area of the first card installing space 71, a large heat radiating effect may be expected, and furthermore, the external noise shielding effect may be achieved.

It should be understood that the present invention may be realized by executing the above-described modifications, and also by performing various design changes within ranges defined in the claims of the present invention.

What is claimed is:

1. A connector for a flash memory card, comprising:
   a connector main body mountable on a mounting wiring board, said connector main body including a first card installing space for accepting the flash memory card from a substantially vertical direction with respect to a major surface of the mounting wiring board so as to hold the flash memory card, and a second card installing space for accepting a chip card between said first card installing space and the mounting wiring board;
   a signal connection contact fixed on said connector main body, said signal connection contact including a contact point portion contacted to a signal connection portion of the flash memory card, and a connection portion electrically connected to the mounting wiring board; and
   a stopper installed in said second card installing space within said second card installing space,
   wherein the chip card is held by the stopper such that the chip card is in electrical contact with the mounting wiring board and such that the flash memory card may be removed without disturbing the electrical contact between the chip card and the mounting wiring board.

2. The connector according to claim 1, further comprising:
   a cover member pivotally mounted with respect to a first end portion of said connector main body, for restricting a first end portion of the flash memory card within said first card installing space under a closed condition that at least a portion of said first card installing space is closed;
   a lock mechanism for locking said cover member to the closed condition with respect to said connector main body; and
   a restricting member for restricting a second end portion of the flash memory card opposed to the first end portion of the flash memory card, said restricting member provided in the vicinity of a second end portion of said connector main body opposite to the first end portion of said connector main body and engaged to the second end portion of the flash memory card,
   wherein the signal connection portion of the flash memory card is provided in the vicinity of an edge of the flash memory card, and
   wherein said contact point portion of said signal connection contact is made in contact with the signal connection portion of the flash memory card at said second end portion of said connector main body.

3. The connector according to claim 1,
   wherein the flash memory card is in a substantially rectangular shape and comprises a notch preventing an erroneous installation and formed in a corner portion of the flash memory card,
   wherein said first card installing space is in a substantially rectangular shape fitted to the flash memory card, and
   wherein said connector main body comprises an erroneous installation preventing portion corresponding to the notch of the flash memory card and provided on said connector main body with being projected to said first card installing space.

4. The connector according to claim 1,
   wherein the chip card is in a substantially rectangular shape and comprises a notch preventing an erroneous installation and formed in a corner portion of the chip card,
   wherein said first card installing space is in a substantially rectangular shape fitted to the chip card, and
   wherein said connector main body comprises an erroneous installation preventing portion corresponding to the notch of the chip card and provided on said connector main body with being projected to said first card installing space.

5. A connection structure for a flash memory card comprising:
   a mounting wiring board;
   a flash memory card connector mounted on said mounting wiring board, said flash memory card connector including:

a connector main body mountable on said mounting wiring board, said connector main body including a first card installing space for accepting the flash memory card from a substantially vertical direction with respect to a major surface of said mounting wiring board so as to hold the flash memory card, and a second card installing space for accepting a chip card between said first card installing space and said mounting wiring board, a signal connection contact fixed on said connector main body, said signal connection contact including a contact point portion contacted to a signal connection portion of the flash memory card, and a connection portion electrically connected to said mounting wiring board, and a stopper installed in said second card installing space within said second card installing space; and a chip card connector different from the flash memory card connecter and including a signal connection contact and mounted on said mounting wiring board, said signal connection contact of said chip card including a contact point portion in contact to a signal connection portion of the chip card, and a connection portion electrically connected to said mounting wiring board, wherein said chip card connector is located within said second card installing space of said flash memory card connector, and wherein the chip card is held by the stopper such that the chip card is in electrical contact with the mounting wiring board and such that the flash memory card may be removed without disturbing the electrical contact between the chip card and the mounting wiring board.

6. An electric apparatus comprising:

the connection structure for a flash memory card according to claim 5.

7. A connector for a flash memory card, comprising:

means for accepting the flash memory card in a first installing space from a substantially vertical direction with respect to a major surface of a mounting wiring board so as to hold the flash memory card, and means for accepting a chip card in a second installing space between said first card installing space and the mounting wiring board;

means for electrically connecting the flash memory card to the mounting wiring board; and means for holding the chip card installed in said second card installing space, wherein the chip card is held by the means for holding such that the chip card is in electrical contact with the mounting wiring board and such that the flash memory card may be removed without disturbing the electrical contact between the chip card and the mounting wiring board.

8. The connector according to claim 7, further comprising:

first means for restricting a first end portion of the flash memory card within said first card installing space under a closed condition that at least a portion of said first card installing space is closed;

means for locking said cover member to the closed condition with respect to said first means for restricting; and second means for restricting a second end portion of the flash memory card opposed to the first end portion of the flash memory card, said second means for restricting provided in the vicinity of a second end portion of said means for accepting the flash memory card opposite to the first end portion of said means for accepting the flash memory card and engaged to the second end portion of the flash memory card.

9. The connector according to claim 7, further comprising:

means for preventing an erroneous installation of the flash memory card.

10. The connector according to claim 7, further comprising:

means for preventing an erroneous installation of the chip card.

11. A connection structure for a flash memory card comprising:

a mounting wiring board;

means for mounting the flash memory card on said mounting wiring board, said means for mounting including:

means for accepting the flash memory card in a first installing space from a substantially vertical direction with respect to a major surface of said mounting wiring board and for holding the flash memory card, and means for accepting a chip card in a second installing space between said first card installing space and said mounting wiring board, means for electrically connecting the flash memory card to the mounting wiring board, and means for holding the chip card installed in said second card installing space; and means for electrically connecting the chip card to the mounting wiring board and being located within said second card installing space, wherein the chip card is held by the means for holding such that the chip card is in electrical contact with the means for electrically connecting the chip card and such that the flash memory card may be removed without disturbing the electrical contact between the chip card and the means for electrically connecting the chip card.

12. An electric apparatus comprising:

the connection structure for a flash memory card according to claim 10.

* * * * *